United States Patent
Kaneko et al.

[15] 3,676,354
[45] July 11, 1972

[54] CORROSION INHIBITOR FOR HYDROCHLORIC ACID PICKLING OF STEEL

[72] Inventors: Thomas M. Kaneko, Trenton; Irving R. Schmolka; John W. Compton, both of Grosse Ile, all of Mich.

[73] Assignee: BASF Wyandotte Corporation, Wyandotte, Mich.

[22] Filed: Oct. 2, 1970

[21] Appl. No.: 77,710

Related U.S. Application Data

[62] Division of Ser. No. 697,631, Jan. 15, 1968, Pat. No. 3,607,781.

[52] U.S. Cl..................252/147, 21/2.7, 134/3, 134/41, 252/8.55 E, 252/148, 252/389, 252/392, 252/DIG. 1
[51] Int. Cl.......................C23f 11/04, C23f 11/12
[58] Field of Search..................252/389, 147, 146, 392, 148, 252/8.55 E, DIG. 1; 21/2.7; 134/3, 41

[56] References Cited

UNITED STATES PATENTS

| 3,098,700 | 7/1963 | Bernard | 21/2.7 |
| 3,477,956 | 11/1969 | Stanford et al. | 21/2.7 |

FOREIGN PATENTS OR APPLICATIONS

| 578,722 | 6/1959 | Canada | 252/146 |

Primary Examiner—Leon D. Rosdol
Assistant Examiner—Irwin Gluck
Attorney—Cedric H. Kuhn, Bernhard R. Swick, Robert E. Dunn, William R. Day and Joseph D. Michaels

[57] ABSTRACT

A corrosion inhibitor composition for addition to aqueous solutions normally corrosive to metal surfaces is prepared by dissolving a surface active agent and an amine in a mixture of mineral acids.

8 Claims, No Drawings

CORROSION INHIBITOR FOR HYDROCHLORIC ACID PICKLING OR STEEL

This application is a divisional application of copending U.S. Pat. application Ser. No. 697,631, filed Jan. 15, 1968, now U.S. Pat. No. 3,607,781.

This invention relates to an additive for an acid pickling bath. It more particularly relates to liquid compositions for restraining the corrosion of ferrous metals in acid pickling baths. In another aspect, the invention is concerned with compositions of acid pickling bath solutions.

Ferrous metals, when being formed into steel sheets, plates, bars, etc., are subjected to elevated temperatures. Exposure to these temperatures results in the formation of a coating of iron oxide on the metal, commonly called mill scale. Before these formed materials can be subjected to further processing, such as, electroplating, galvanizing, cold rolling, etc., this scale must be removed. In commercial operations, this scale is removed by immersing the sheet, plate or bar in a suitable acid solution, called an acid pickling bath. The acid solution attacks and dissolves the scale. Once the scale is dissolved, the acid is then free for further attack upon the metal. In order to reduce this attack on the metal, corrosion inhibitors are added to the pickling bath solution.

In the last few years several inhibitors have been found which reduce the corrosive properties of the pickling bath solution. However, none of these materials heretofore discovered has been entirely satisfactory. In cases where the inhibitor did a good job of reducing the corrosive properties of the acid pickling bath solution, either the wetting agent included in the solution produced an undesirable amount of foam or so much of the inhibitor had to be added to the solution as to make the process uneconomical. If the concentration of wetting agent in the formulation was decreased, usually the corrosion inhibitor lost a great deal of its effectiveness because of the increase in the surface tension of the acid pickling solution.

It is, therefore, an object of this invention to provide a composition which will aid in inhibiting corrosion of metal surfaces during the acid pickling process. It is a further object of this invention to provide a composition that will facilitate rapid removal of surface impurities. It is another object of this invention to reduce acid consumption during the acid pickling process. It is an additional object of this invention to inhibit immediate flash rusting or "sulling" of metal surfaces during the acid pickling process. It is still a further object to produce higher quality metal surfaces. Other and further objects and advantages of the invention will become apparent to those skilled in the art upon consideration of the following disclosure.

The present invention resides in a corrosion inhibitor. Broadly speaking, the corrosion inhibitor comprises a surface active agent, a hydroxyalkylamine and a combination of mineral acids. More specifically, the corrosion inhibitor compositions of this invention consist essentially of from about 5 to 32 percent by weight of a nonionic surface active agent as described below, from about 2 to 14 percent by weight of a hydroxyalkylamine, from about 6 to 30 percent by weight of phosphoric acid, from about 3 to 13 percent by weight of hydrochloric acid, and from about 11 to 84 percent by weight of water.

The nonionic surface active agents employed in the present invention are those prepared from the addition of water-soluble polyoxyethylene groups to a water-insoluble polyoxypropylene chain. The polyoxypropylene chain is prepared by adding propylene oxide to the two hydroxy groups of propylene glycol and chain extending until the molecule becomes hydrophobic, which occurs a molecular weights greater than 800. Ethylene oxide is then added to both ends of the polyoxypropylene molecule and then chain extended until the ethylene oxide constitutes anywhere from 10 to 90 percent by weight of the final molecule.

The structure of these nonionic surface active agents can best be illustrated by the following structure:

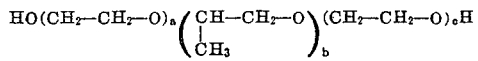

wherein $a$ is an integer of from about 1 to 500, $b$ is an integer of from about 14 to 70, and $c$ is an integer of from about 1 to 500.

The present invention encompasses both polyoxyethylene-polyoxypropylene block copolymers as described above as well as blends of polyoxyethylene-polyoxypropylene block copolymers.

The hydroxyalkylamines that may be used in the present invention include monoalkanolamines, such as, for example, monoethanolamine, monopropanolamine, monoisopropanolamine, and the like; dialkanolamines, such as, for example, diethanolamine, compositions shown and the like; and trialkanolamines such as, for example, triethanolamine, tripropanolamine, and the like. A hydroxyalkylamine which was found to be particularly suitable for this invention is monoethanolamine.

The present invention resides in the particular combination of ingredients when used in the indicated amounts. The resulting corrosion inhibitor compositions have many desirable properties as compared to compositions shown in the art as being suitable for the acid pickling of steel. It has been found that the present compositions are more economical because of the relatively low price of the ingredients used in relation to the small amount needed in the acid pickling bath solution. It has also been found that by adjusting the ratio of the ingredients within the aforementioned specified ranges, a low foaming inhibitor can be produced.

It has been found that amounts of inhibitor varying from about one part by weight in 15 parts by weight acid solution and upwards to about 800 parts by weight mineral acid solution have satisfactorily improved the pickling operation. The large range over which this inhibitor may be used is due to the varying concentrations of the nonionic surface active agent and hydroxyl amine in combination with the minerals acids plus the fact that the effectiveness of the inhibiting composition is not substantially reduced when the concentration is changed.

When a low foaming inhibitor is desired, the nonionic surface active agent of the invention may consist of a blend of polyoxyethylene-polyoxypropylene block copolymers. More specifically, the nonionic surface active agent consists of two block copolymers, each prepared by the sequential addition of ethylene and propylene oxides to propylene glycol. One acts primarily as a wetting agent while the other tends to function as a defoaming agent. The wetting agent has a molecular weight of from about 7,800 to 9,800 with the ethylene oxide groups representing from about 75 to 85 percent by weight of the polymer. The defoaming agent has a molecular weight of from about 1,500 to 2,500 and the ethylene oxide groups represent from about 10 to 20 percent by weight of the surface active polymer. In making this blend, the ratio of defoaming agent to wetting agent is one part defoaming agent to five to 20 parts wetting agent with a preferred ratio of one part defoaming agent to eight to 12 parts wetting agent.

A preferred low-foaming corrosion inhibitor composition was found which also exhibited effective corrosion inhibition when used in ratios of from about one part by weight inhibitor to about 100 to 800 parts by weight acid pickling solution. The composition of this inhibitor consisted essentially of from about 25 to 32 percent by weight of a nonionic surface active agent consisting essentially of a blend of polyoxyethylene-polyoxypropylene block copolymers, from about 5 to 14 percent by weight of a hydroxyalkylamine, from about 20 to 30 percent by weight of phosphoric acid, from about 7 to 13 percent by weight of hydrochloric acid, and from about 11 to 43 percent by weight of water.

The inhibitor has been found to work well with any of the commercially used pickling acids such as, for example, hydrochloric acid, sulphuric acid and the like.

Both high and low concentrations of the corrosion inhibitor gives surface tension values of less than 37 dynes/cm. This low surface tension enables the solution to drain-off quickly, thereby reducing acid consumption and facilitating rapid rinsing by such effective drainage. These desirable properties are believed to be attributable, at least to some extent, to the particular surface active agents used in the present inhibitor. This quick drain-off also prevents immediate rusting of the metal surface, called "sulling" or flash rusting, and also minimizes the harmful amount of fumes evolving from the corrosive reaction. This also increases production rates by speeding up the acid pickling process and at the same time decreasing loss of metal by reducing corrosive attack.

In formulating an inhibitor with an effectiveness superior to those presently commercially available, it was found that the order in which the ingredients are mixed and the relative proportions of the ingredients are important in preparing concentrations which do not gel, discolor, or result in the precipitation of the amine.

In accordance with this invention, the corrosion inhibitor compositions are prepared by a process comprising the following steps:

a. forming an acid solution by adding with mixing an aqueous solution of phosphoric acid to an aqueous solution of hydrochloric acid;

b. adding incrementally to said acid solution a nonionic surface active agent selected from the group consisting of a polyoxyethylene-polyoxy-propylene block copolymer and a blend of polyoxyethylene-prolyoxypropylene block copolymers;

c. allowing each increment of said nonionic surface active agent to dissolve completely before adding an additional increment;

d. maintaining the temperature of the resulting solution at less than 50° C. during the addition of the nonionic surface active agent; and e. adding a hydroxyalkylamine to said resulting solution, while maintaining the temperature of the solution at less than 50° C. If this sequence of addition of the ingredients is not followed, precipitation of amine hydrochloride, phosphate or both is encountered. Further, the maintaining of the solution at less than 50° C. facilitates dissolution of the surfactant and prevents discoloration of the product.

The following examples demonstrate the procedures, formulations and effectiveness of corrosive inhibitor compositions of the present invention. It is to be understood that the examples are not to be considered as being unduly limitative of the invention.

SURFACTANT A

Surfactant A was a block copolymer of ethylene and propylene oxides prepared by adding propylene oxide to a propylene glycol initiator to form a polyoxypropylene glycol of 1,750 molecular weight and then condensing ethylene oxide with the glycol until the final product comprises about 80 percent by weight of ethylene oxide. The theoretical molecular weight of this polymer was 8,750.

SURFACTANT B

Surfactant B was a block copolymer of ethylene and propylene oxides derived from a propylene glycol initiator to which propylene oxide is added to form a polyoxypropylene glycol of 1,750 molecular weight and then condensing ethylene oxide with the glycol until the final product comprises about 10 percent by weight of ethylene oxide. The theoretical molecular weight of this polymer was 1,950.

SURFACTANT C

Surfactant C was a blend of 90 parts by weight of Surfactant A and 10 parts by weight of Surfactant B.

EXAMPLE I

This example demonstrates the procedure that was followed in preparing a corrosion inhibitor of the present invention.

To 595 grams of 31% HCl, 700 grams of 75% $H_3PO_4$ were added slowly while stirring. With continued stirring, 625 grams of Surfactant C were added in small increments of about 25–50 grams, allowing each increment to dissolve completely before adding an additional increment. The container was placed in an ice bath to prevent the mixture from exceeding 50° C. in temperature. Also with continued stirring, 282 grams of monoethanolamine were added very slowly and carefully to prevent sputtering and overheating. The preparation of the concentrated inhibitor composition was completed with the addition of the monoethanolamine.

EXAMPLE II

The following example demonstrates the effectiveness of corrosion inhibition of an inhibitor of the present invention when compared with an acid bath solution which contained no corrosion inhibitor as well as an acid bath solution which contained a commercially available product. The compositions of the inhibitors used are as follows:

A. A commercially available prior art inhibitor of the composition:

|  | Weight Percent |
|---|---|
| Monoethanolamine | 2.6 |
| Orthophosphoric Acid | 6.4 |
| Hydrochloric Acid | 3.6 |
| Polyethylene Glycol | 5.7 |
| Water (by difference) | 81.7 |
| Total | 100.0 |

B. An inhibitor of the present invention with the composition prepared according to the procedure described in Example I:

|  | Weight Percent |
|---|---|
| Surfactant C | 28.4 |
| $H_3PO_4$, 75% conc. by wt. | 31.8 |
| HCl, 31% conc. by wt. | 27.0 |
| Monoethanolamine | 12.8 |
| Total | 100.0 |

The tests were carried out by immersing a previously weighed 2 × 2 inch sample of a commercial product, type E–6 standard ⅛-inch hot rolled sheet steel, in a 20° Be hydrochloric acid solution containing approximately 20% $FeCl_2$. The solution was maintained at 170° F. The sheets were left in the solution for 22 minutes, an unusually long time, so that the differences in corrosion would be better accentuated. The sheets were then removed from the solution, drained, rinsed with water, dried by rinsing in acetone and evaporating off the latter and then weighed in order to determine the percent weight loss. The results of these tests were as follows:

| Run No. | Inhibitor | 20° Be HCl/Inhibitor | % Wt. Loss |
|---|---|---|---|
| 1 | None | — | 14.4 |
| 2 | (A) | 50/1 | 13.6 |
| 3 | (B) | 400/1 | 11.3 |

It will be noted that even with a large quantity of commercial product (A), the amount of corrosion inhibition was still considerably less when using only a small quantity of product (B) of the present invention.

EXAMPLE III

This example demonstrates the effectiveness of a low concentrated corrosion inhibitor of the present invention in comparison with a high concentrated, low foaming corrosion inhibitor of the present invention.

Two different concentrations of the present invention were formulated. The low concentrated formulation was diluted with a 20° Be hydrochloric acid solution in a ratio of 15 parts acid solution to 1 part of inhibitor. The highly concentrated formulation was diluted with a 20° Be hydrochloric acid solution in a ratio of 100 parts acid solution to 1 part of inhibitor. A third solution of 20° Be hydrochloric acid which contained no inhibitor was also used in order to demonstrate the effectiveness of the present inhibitors.

The formulations of the low and high concentrated corrosion inhibitors were as follows:

| Ingredients | Percent by Weight Low Concentrate | High Concentrate |
|---|---|---|
| Surfactant A | 5.7 | — |
| Surfactant C | — | 28.4 |
| Monoethanolamine | 2.6 | 12.8 |
| H₃PO₄ (85% conc.) | 7.5 | 31.8 |
| HCl (37% conc.) | 9.7 | 27.0 |
| Water (by difference) | 74.5 | — |
| Total | 100.0 | 100.0 |

The tests were carried out by immersing a previously weighed 2 × 2 inch sample of a commercial product, type E–6 standard ⅛-inch hot rolled sheet steel, into a 20° Be hydrochloric acid pickling bath containing approximately 20% FeCl₂. In order to simulate actual plant and pickling conditions, the sheets were immersed for 2 minutes in each solution while the temperature of the solution was held at 176° F. The sheets were then removed, rinsed with water, rinsed with acetone, dried, and reweighed. The results were as follows:

| | No. Inhibitor | Low Concentrate | High Concentrate |
|---|---|---|---|
| Surface¹ Tension | 57.2 dynes/cm. | 36.6 dynes/cm. | 34.5 dynes/cm. |
| % Wt. Loss | 1.91% | 1.22% | 1.08% |

¹Determined according to the Fisher-Surface Tension ring method. This method consists of submerging a platinum or iridium ring into the solution to be tested and then measuring the force required to detach the ring from the air-liquid interface.

EXAMPLE IV

This example demonstrates the effectiveness of a low foaming highly concentrated corrosion inhibitor of the present invention when used in various concentrations in the pickling solution.

The corrosion inhibitor used in this demonstration consisted essentially of the following ingredients:

| Surfactant C | 28.4% |
|---|---|
| Monoethanolamine | 12.8% |
| H₃PO₄ (85% conc.) | 31.8% |
| HCl (37% conc.) | 27.0% was sheet |

The concentration of the corrosion inhibitor in the acid solution was varied from 1 part inhibitor to from 100 to 800 parts of 20° Be hydrochloric acid solution. The tests were run to compare the effectiveness of the different concentrations of the same inhibitor. The procedure was to immerse a previously weighed 2 × 2 inch sample of a commercial product, type E–6 standard ⅛-inch hot rolled sheet steel, into a 20° Be hydrochloric acid bath solution containing approximately 20% FeCl₂. The sheets were immersed for 22 minutes with the solution being maintained at 175° F. The sheets were then removed, rinsed with water, dried by rinsing with acetone and evaporating off the latter, and then reweighed. The results were as follows:

| Ratio of Acid/Inhibitor | Surface Tension Dynes/cm. | Wt. Loss of Steel, Percent |
|---|---|---|
| 100/1 | 33.0 | 9.5 |
| 200/1 | 33.2 | 9.5 |
| 400/1 | 34.5 | 9.7 |
| 600/1 | 37.6 | 10.6 |
| 800/1 | 40.2 | 10.9 |

The above data illustrate the effectiveness of the low foaming, highly concentrated corrosion inhibitor over a large range of dilutions in the pickling bath solution. It can be seen that acid to inhibitor ratios of as high as 800 to 1 are effective for corrosion inhibition.

EXAMPLE V

This example demonstrates the synergistic effect of the amine in combination with the nonionic surface active agent.

The tests were carried out by immersing previously weighed 2 × 2 inch samples of a commercial product, type E–6 standard ⅛-inch hot rolled sheet in a 20° Be hydrochloric acid bath containing approximately 20% FeCl₂ which was at 175° F. The sheets were left in the solution for 22 minutes, then removed, rinsed with water, and dried by rinsing with acetone, evaporating off the latter and reweighed. The ratio of the inhibitor to acid, in each case was held at one part of inhibitor to 400 parts of acid.

| | Inhibitor, % by Wt. | | | |
|---|---|---|---|---|
| | A | B | C | D |
| Surfactant C | 0 | 0 | 28.4 | 28.4 |
| Monoethanolamine | 0 | 12.8 | 0 | 12.8 |
| H₃PO₄ (75% conc.) | 31.8 | 31.8 | 31.8 | 31.8 |
| HCl (31.5% conc.) | 68.2 | 55.4 | 39.8 | 27.0 |

The results of the comparison of the above inhibitors were as follows:

| Inhibitor | Surface Tension Dynes/cm. | Wt. Loss of Steel, Percent |
|---|---|---|
| A | 57.2 | 16.8 |
| B | 49.7 | 16.0 |
| C | 46.7 | 13.9 |
| D | 34.5 | 9.7 |

It will be noted from the above data that although the monoethanolamine and the surfactant separately showed a smaller percent weight loss of treated steel, the combination of the monoethanolamine and the surfactant substantially and significantly reduced the percent weight loss of the treated steel. Thus, this combination of monoethanolamine and surfactant synergistically decreased the corrosive attack upon the sheet steel so treated.

What is claimed is:

1. An acid pickling bath solution which contains between 15 and 800 parts of mineral acid to 1 part of corrosion inhibitor composition consisting essentially of:

a. from about 5 to 32 percent by weight of a nonionic surface active agent selected from the group consisting of a polyoxyethylene-polyoxypropylene block copolymer and a blend of polyoxyethylene-polyoxypropylene block copolymers, said nonionic surface active agent corresponding to the formula:

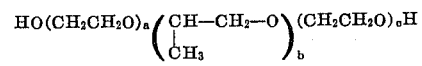

wherein $a$ is an integer of from about 1 to 500, $b$ is an integer of from about 14 to 70, and $c$ is an integer of from about 1 to 500, b. from about 2 to 14 percent by weight of hydroxy (lower alkyl) amine, c. from about 6 to 30 percent by weight of phosphoric acid, d. from about 3 to 13 percent by weight of hydro-chloric acid, and e. from about 11 to 84 percent by weight of water, based on 100 weight percent of the total corrosion inhibitor composition.

2. The pickling bath of claim 1 wherein the nonionic surface active agent is a polyoxyethylene-polyoxypropylene block copolymer.

3. The pickling bath of claim 1 wherein the nonionic surface active agent is a blend of polyoxyethylene-polyoxy-propylene block copolymers.

4. The pickling bath of claim 1 wherein the hydroxy (lower alkyl) amine is monoethanolamine.

5. The pickling bath of claim 1 wherein the corrosion inhibitor composition consists essentially of:
 a. from about 25 to 32 percent by weight of the nonionic surface active agent, the nonionic surface active agent being the blend of block copolymers,
 b. from about 5 to 14 percent by weight of the hydroxy (lower alkyl) amine,
 c. from about 20 to 30 percent by weight of phosphoric acid,
 d. from about 7 to 13 percent by weight of hydrochloric acid, and
 e. from about 11 to 43 percent by weight of water.

6. The pickling bath of claim 5 wherein the blend of polyoxyethylene-polyoxypropylene block copolymers consists essentially of from about 5 to 20 parts by weight of a first block copolymer having a molecular weight of from about 7,800 to 9,800 with ethylene oxide groups representing from about 75 to 85 percent by weight of the first copolymer to one part of a second block copolymer having a molecular weight of from about 1,500 to 2,500 with ethylene oxide groups representing from about 10 to 20 percent by weight of the second copolymer.

7. The pickling bath of claim 1 wherein the mineral acid is either hydrochloric acid or sulphuric acid.

8. The pickling bath of claim 7 wherein the mineral acid is hydrochloric acid.

* * * * *